United States Patent Office 3,014,804
Patented Dec. 26, 1961

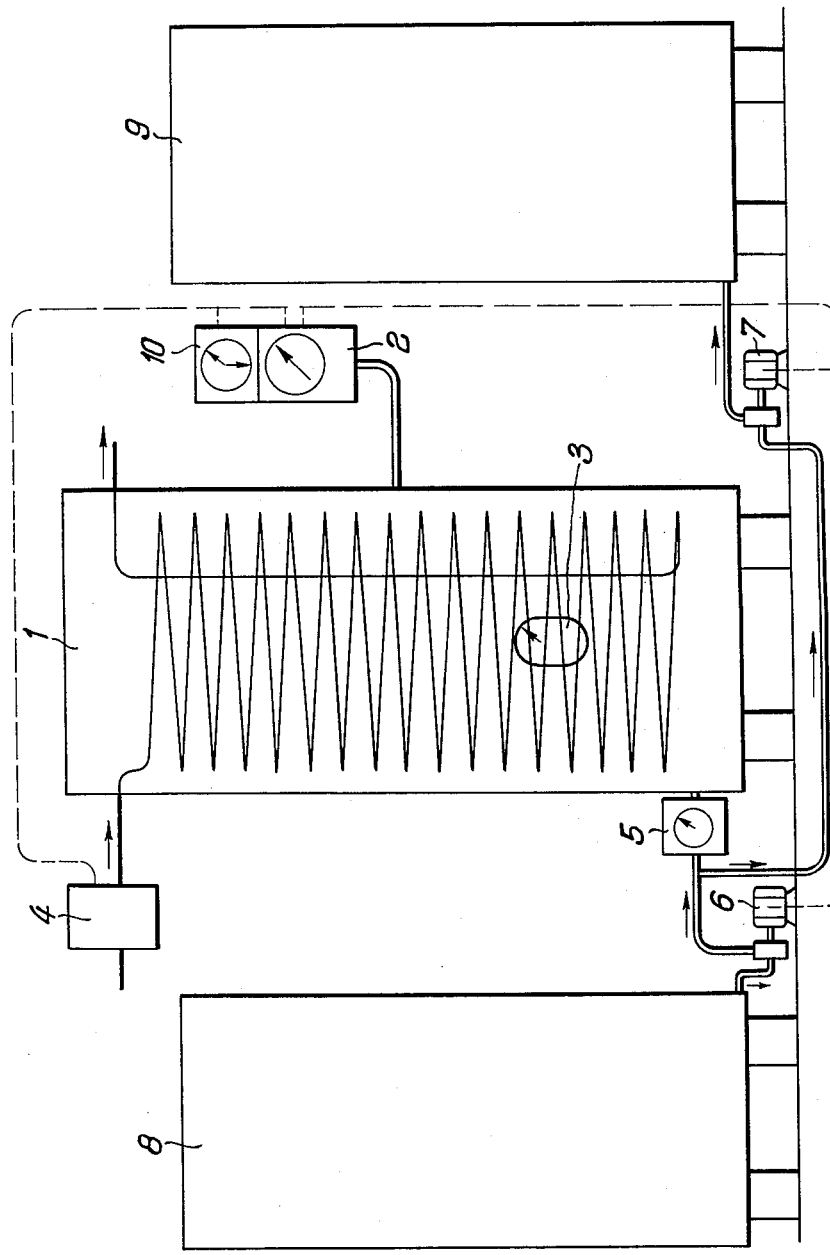

3,014,804
METHOD FOR PRODUCING ACETIC ACID FROM ALCOHOL CONTAINING FERMENTATION MEDIUM
Heinrich Els and Friedrich Martens, Bonn (Rhine), Germany, assignors to Heinrich Frings Kommanditgesellschaft, Bonn (Rhine), Germany
Filed Oct. 2, 1958, Ser. No. 764,874
Claims priority, application Germany Oct. 3, 1957
5 Claims. (Cl. 99—147)

This invention relates to a process and apparatus for operating and working on aerobic fermentation, particularly apparatus for producing acetic acid and vinegar in which the fermentation process proceeds by itself periodically under self-withdrawal of finished fermented substratum or fermented substance and the automatic addition of mash. The reaction heat produced by the fermentation is removed by cooling controlled by this heat and is withdrawn and the withdrawal of the fermented substratum as well as the addition of mash is carried out by automatic measuring of the fermentation procedure.

It is an object of the invention to provide a fermentation apparatus for producing acetic acid which is carried out in such a way that through self-action the finished fermentation substance, as for example acetic acid, is withdrawn from the apparatus in definite intervals and in definite amounts with new fermentation liquid added into the apparatus to take the place of the acetic acid withdrawn. In this way there is avoided the possible human failure and the output is thus increased.

A further object of the invention resides in a process in which a definitely high fermentation is achieved and a definite acetic acid concentration is attained so that a product such as vinegar may be withdrawn from the apparatus and thereafter upon the entire or partial throttling of the cooling takes place after which a fresh amount of mash is fed into the apparatus in such amounts which provide for continuous or periodic operation with the temperature in the apparatus remaining essentially constant. As soon as the required amount of mash is introduced the partial or complete throttling of the cooling by water will be discontinued, that is, the cooling will function normally again. The process will continue so long until the concentration of the acetic acid has attained its desired value after which the cycle of withdrawing vinegar, throttling the cooling by water, introducing fresh mash and reoperating the cooling by water will again proceed.

In the process according to the invention, as soon as a definitely high concentration of the fermentation product, for example, acetic acid, or a definite low concentration of the alcohol is attained in the apparatus, a definite amount of finished fermentation substrate will be withdrawn from the apparatus, but not before, and during this procedure will any new mash be fed into the apparatus. The withdrawn fermentation substrate as for example the withdrawn vinegar is of a unitary concentration. A fresh mash is directed into the apparatus in one amount or in partial amounts in such a way that the temperature remains constant. In this way it will be possible to carry out the fermentation in the most efficient manner.

The process proceeds in such a way that it is not necessary that it must be watched over since the fermentation apparatus is so regulated that the various cycles follow one after the other dependent upon the attainment of the desired concentrations.

The temperature regulation is accomplished by a contact thermometer and the heat is measured additively by a suitable calorimeter.

The fermentation is controlled in any suitable manner by the sum of the formed calories or particularly in definite periods of fermentation measured additive by electrically or mechanically operated valves in definite amounts so that by an analytical reagent as for example sodium liquor for vinegar fermentation, such substances can be brought together and mixed to determine when the fermentation substrate is to be removed and new mash to be introduced.

It is also possible to use a clockwork to operate an electric circuit to provide for the outflow of the finished fermentation substrate.

In a preferred form of apparatus for carrying out the process of the invention there is provided a measuring gage to set the outlet pump for the vinegar into operation when a definite concentration of the fermented product has been attained. After a certain amount of the fermentated substrate has been withdrawn from the apparatus as measured by a gage, another pump will be set in operation to introduce a fresh supply of mash into the fermentation vat and this is suitably measured by a volume gage and at least a fermentation thermometer. The cooling of the fermentation vessel does not exceed a certain value and the various cycles are repeated as often as desired.

Instead of pumps, it is possible to use regulatable valves and the like. Also, it is possible to use gages operable by the fluid level in the vessel and these electrically control the pump and valves as desired. Also, it is possible to use volume measuring devices and clockwork operated devices to control the concentration or to operate the outlet pump.

Further objects will be apparent from the following description when considered in connection with the accompanying drawing.

The drawing is a diagrammatic representation of an apparatus according to the invention, for example, to produce vinegar.

The acetic acid concentration in a submerged vinegar producer or vat 1 is controlled and observed by a concentration measuring device 2 in accordance with the invention. In place of a submerged vinegar producer it is, of course, obvious to also use a vinegar producer of another type or other fermentation apparatus. The concentration measuring device 2, which preferably operates electrically, can be built directly on and applied to the vinegar producer or may be connected thereto by a suitable pipe or line. The temperature in the vinegar producer 1 is observed by at least one thermometer 3. Preferably the thermometer 3 is connected by electrical means to a cold water supply valve 4 to control the amount of cold water to be passed through the vinegar vat 1.

Further there is provided a measuring apparatus or gage 5 to indicate amounts so that the amount of vinegar or the amount of mash can be definitely determined. Preferably the volume measuring device 5 is connected directly to the vinegar producer. In the simplest form the column measure may consist of a light object which floats on the liquid in the upright column so that dependent upon the height of the fluid level in the fermentation vat, the float may bridge and close two spaced contacts or open the latter. Obviously the conductivity of the vinegar solution may be utilized by bridging two electrodes projecting in the liquid. The apparatus 1 is in communication with a mash container or tank 8 by an inlet pipe and by a removal or outlet pipe with a storage container 9 for the finished product. In the inlet pipe there is a pump and motor unit 6 and also in the outlet pipe there is likewise a pump and motor unit 7. Further there is preferably provided a control clock 10 to operate the concentration measuring device 2 and which after certain definite intervals or after a time cycle, is set to operate the electric control circuit.

The apparatus operates as follows.

When, for example, the acetic acid concentration has reached a definite limit in the vinegar generator or vat 1, the concentration measuring device 2 will set the pump 7 in operation, due to the acetic acid concentration or also due to the alcohol concentration in the vinegar component as, for example, by a self-titration of the acid. The pump 7 forces the vinegar out of the generator vat 1 into the storage tank 9 for such period until the previously predetermined fluid is pumped out of the vinegar generator. By closing or opening the lower contacts of the measuring gage 5, the pump 7 will be brought to a standstill and at the same time closing the cold water valve 4, the cold water flow in the coil of the vinegar generator vat 1 will be stopped or essentially diminished. Further the pump unit 6 will now be set in operation by the volume measuring gage 5 which will feed such an amount of mash from the tank 8 into the vinegar still 1 so that the temperature in the vinegar vat will remain constant, that is, the thermometer 3 will be observed to thus guide the pump 6 dependent upon the temperature limits and will again set the pump in motion when due to the reaction heat, the temperature in the vinegar vat has sufficiently increased. The addition of mash will take place for such time until the amount of liquid is at its desired height in the vinegar vat 1 and thereby the volume measuring gage 5 will control the closing or opening of the upper pair of contacts for the thermometer 3 to the pump unit 6 to control the hot water entry to allow cold water flow through the coil of the fermentation tank 1.

After a new mash batch has been added the fermentation will continue under automatic temperature regulation until the desired concentration has been attained by the concentration gage 2 and the exhaust pump 7 will be operated again whereby the foregoing cycles will be repeated.

By means of a clock 10 it is possible to time the different process steps in the sense of a regulated cycle of procedure.

By fermentation of very uniform mash and uniform fermentation procedure there can be achieved a method which may eliminate the concentration gage 2. It is sufficient in that case that the clock 10 will periodically set the pump unit 7, etc. in operation.

The fluid measuring gage 5 can as well be provided in the inlet pipe as in the outlet pipe.

We claim:

1. The process for manufacturing acetic acid from alcohol-containing fermentation medium by oxidative fermentation, comprising (a) fermenting such medium kept at a predetermined temperature by indirect cooling with a cooling liquid, the cooling of which is automatically regulated in dependence on the temperature of the fermenting medium until predetermined concentrations of acetic acid and alcohol, respectively, in said medium are attained; (b) automatically discharging a partial predetermined amount of said medium when said predetermined concentrations are reached; (c) at least partially reducing cooling of the residual fermenting medium; (d) automatically supplying a predetermined amount of fresh fermentation medium to said residual fermenting medium, the rate of said supply being automatically regulated in dependence on the temperature of the fermenting medium thereby maintaining a constant fermentation temperature; (e) restoring unreduced automatical cooling of the fermenting medium in dependence on its temperature, upon completing the supply of said predetermined amount of fresh fermentation medium; (f) continuing fermentation until said predetermined concentrations of acetic acid and alcohol are reached again; and (g) repeatedly carrying out the operations (a)–(f).

2. A process as claimed in claim 1, in which the oxidative fermentation is a submerged fermentation.

3. A process as claimed in claim 1, in which fermenting medium is periodically introduced into a measuring gage, by which operation (b) is released.

4. A process as claimed in claim 1, in which the volume of the discharged fermenting medium is measured and the means used for measuring this volume automatically stops operation (b) and releases said operations (c) and (d).

5. A process as claimed in claim 1, in which the volume of the supplied fresh fermentation medium is measured and the means used for measuring this volume automatically stops operation (d) and releases said operations (e) and (f).

References Cited in the file of this patent

UNITED STATES PATENTS

| | | |
|---|---|---|
| 1,880,381 | Frings | Oct. 4, 1932 |
| 2,089,412 | Owens | Aug. 10, 1937 |
| 2,531,029 | Cohee | Nov. 21, 1950 |
| 2,707,683 | Hromatka et al. | May 3, 1955 |